United States Patent
Kawase

(10) Patent No.: US 8,601,793 B2
(45) Date of Patent: Dec. 10, 2013

(54) MALFUNCTION DIAGNOSTIC DEVICE FOR EXHAUST GAS CONTROL DEVICE

(75) Inventor: Kenichiro Kawase, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 291 days.

(21) Appl. No.: 13/059,177

(22) PCT Filed: Aug. 19, 2009

(86) PCT No.: PCT/IB2009/006583
§ 371 (c)(1), (2), (4) Date: Feb. 15, 2011

(87) PCT Pub. No.: WO2010/020860
PCT Pub. Date: Feb. 25, 2010

(65) Prior Publication Data
US 2011/0146242 A1    Jun. 23, 2011

(30) Foreign Application Priority Data
Aug. 20, 2008  (JP) ................. 2008-211619

(51) Int. Cl.
*F01N 3/00*    (2006.01)
*F01N 3/02*    (2006.01)

(52) U.S. Cl.
USPC ............................ 60/277; 60/311

(58) Field of Classification Search
USPC .......................... 60/277, 286, 295, 297, 311
See application file for complete search history.

(56) References Cited

U.S. PATENT DOCUMENTS

| 5,437,154 A | * | 8/1995 | Sato et al. ............ 60/276 |
| 2005/0188679 A1 | | 9/2005 | Miura | |

FOREIGN PATENT DOCUMENTS

| JP | 62 35009 | | 2/1987 | |
| JP | 2003 155920 | | 5/2003 | |
| JP | 2006291834 A | * | 10/2006 | ............ F01N 3/20 |
| JP | 2007 332932 | | 12/2007 | |

OTHER PUBLICATIONS

International Search Report issued Feb. 9, 2010 in PCT/IB09/06583 filed Aug. 19, 2009.
Office Action issued Jul. 6, 2010 in Japanese Patent Application No. 2008-211619, filed Aug. 20, 2008 (with partial English—language translation).

* cited by examiner

*Primary Examiner* — Audrey K Bradley
(74) *Attorney, Agent, or Firm* — Oblon, Spivak, McClelland, Maier & Neustadt, L.L.P.

(57) ABSTRACT

A malfunction diagnostic device for an exhaust gas control device is provided. The malfunction diagnostic device includes a malfunction determination unit that determines an exhaust gas control device provided in an exhaust system of an internal combustion engine malfunctions when a parameter that indicates exhaust gas purification performance of the exhaust gas control device crosses a threshold. A deterioration determination unit determines the degree of deterioration of the exhaust gas control device. A variable threshold setting unit variably sets the threshold based on the degree of deterioration of the exhaust gas control device in such a manner that the likelihood that the exhaust gas control device is determined to be malfunctioning is lower at lower degrees of deterioration of the exhaust gas control device.

13 Claims, 7 Drawing Sheets

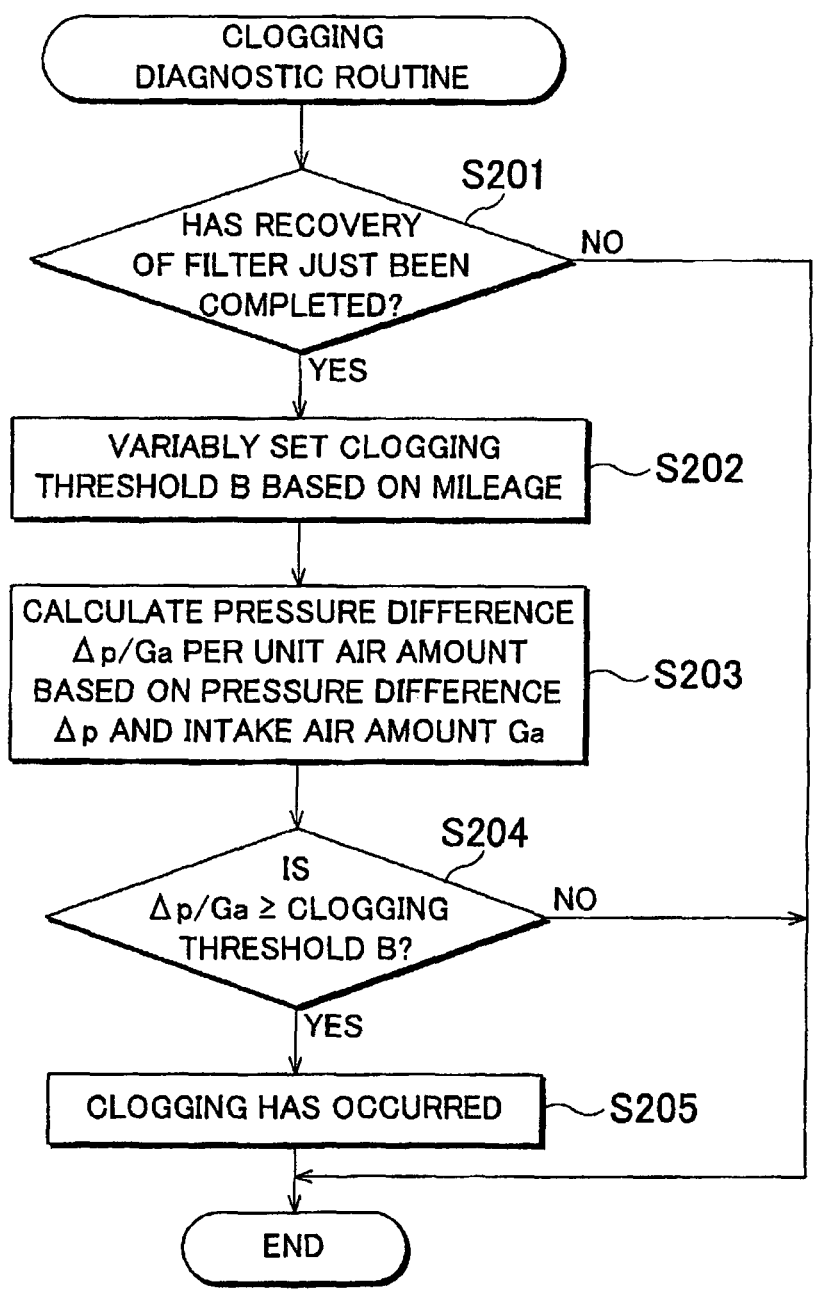

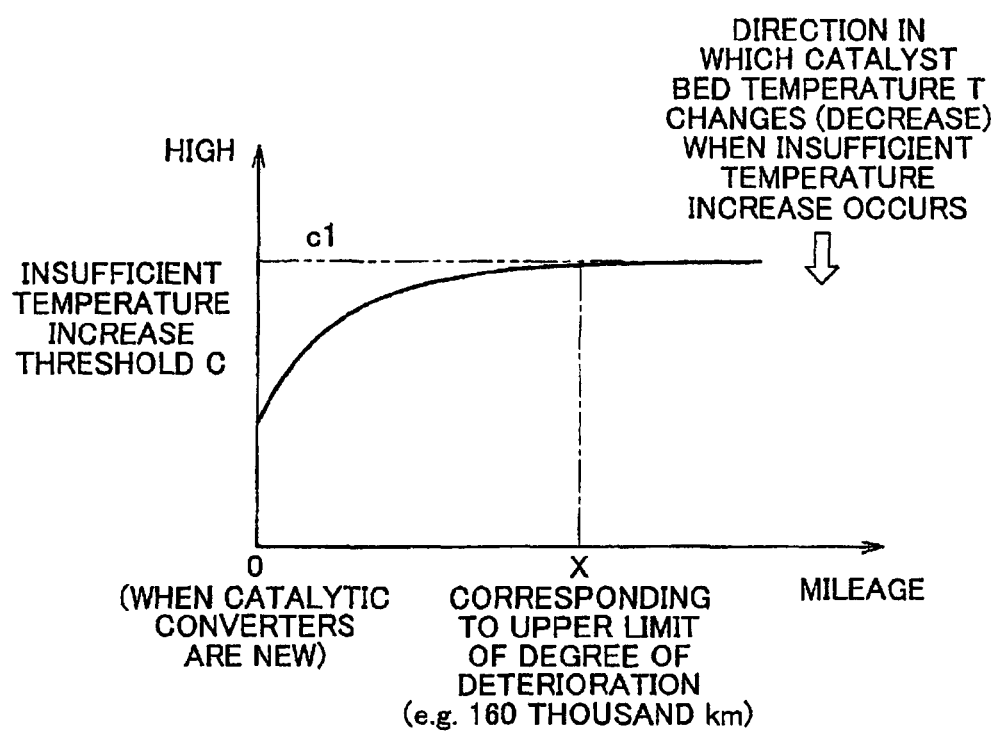

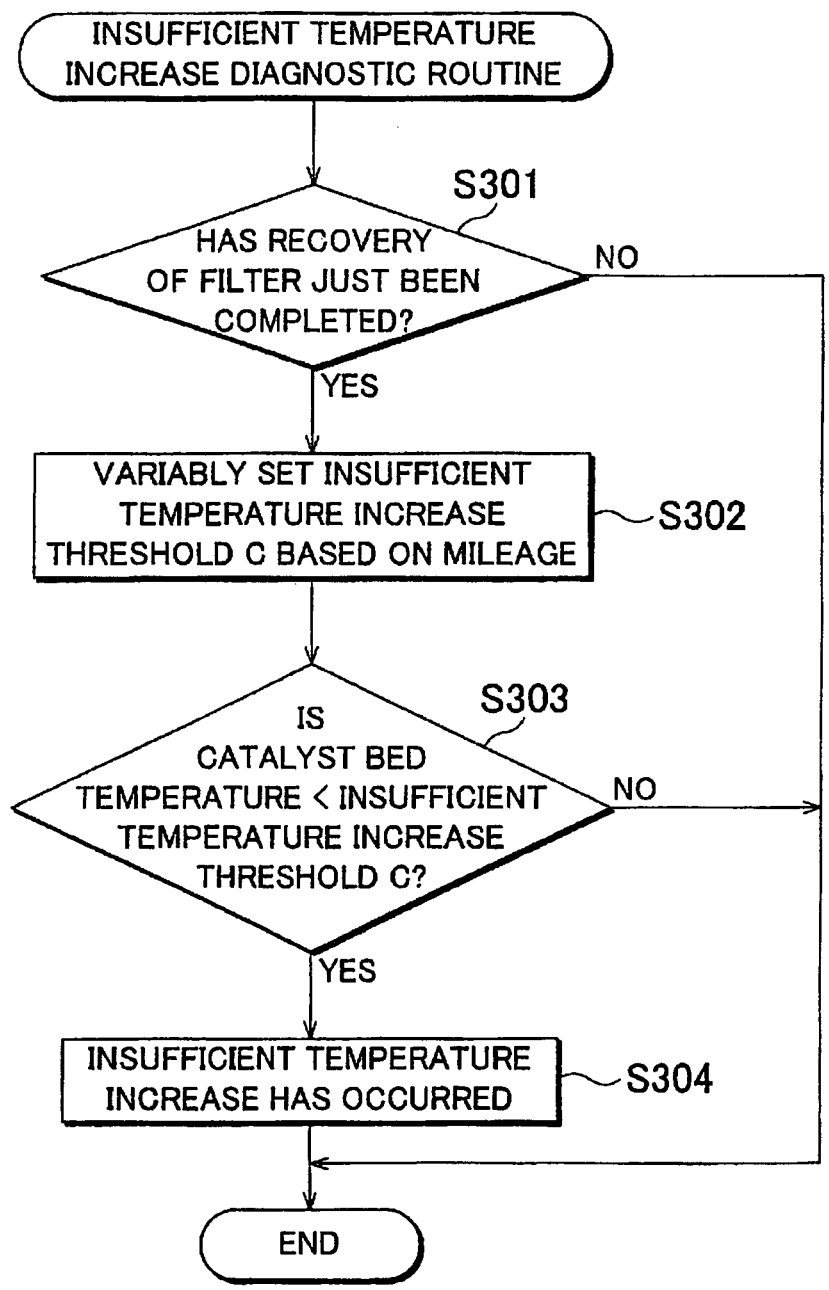

MALFUNCTION DIAGNOSTIC DEVICE FOR EXHAUST GAS CONTROL DEVICE

BACKGROUND OF THE INVENTION

1. Field of the Invention

The invention relates to a malfunction diagnostic device for an exhaust gas control device.

2. Description of the Related Art

In an internal combustion engine, for example, an automobile diesel engine, an exhaust gas control device that purifies the exhaust gas is provided in an exhaust system. Examples of this type of exhaust gas control device include a PM filter that traps particulate matter (hereinafter, referred to as "PM" where appropriate) which is composed mainly of soot, a catalytic converter that supports a catalyst which purifies the exhaust gas by removing hydrocarbon (HC), carbon monoxide (CO), nitrogen oxide (NOx), etc. from the exhaust gas. Whether these exhaust gas control devices malfunction may be determined based on parameters that indicate the exhaust gas purification performance of the exhaust gas control devices. More specifically, if the parameter that indicates the exhaust gas purification performance of the exhaust gas control device crosses a predetermined threshold, it is determined that the exhaust gas control device malfunctions.

As a parameter that indicates the exhaust gas purification performance of an exhaust gas control device, for example, the difference in pressure between the upstream side and the downstream side of the exhaust gas control device provided in an exhaust system may be used, as described in Japanese Patent Application Publication No. 2003-155920 (JP-A-2003-155920). According to JP-A-2003-155920, a threshold used to determine whether clogging of the exhaust gas control device has occurred (hereinafter, referred to as "clogging threshold") and a threshold used to determine whether perforation of the exhaust gas control device has occurred (hereinafter, referred to as "perforation threshold") are calculated based on the engine operating state, for example, the engine speed and the fuel injection amount. If clogging of the exhaust gas control device has occurred and the exhaust gas purification performance thereof has deteriorated, the above-described pressure difference increases due to the clogging. Therefore, if the pressure difference is equal to or greater than the clogging threshold, it is determined that clogging of the exhaust gas control device has occurred. If perforation of the exhaust gas control device has occurred due to, for example, melting and the exhaust gas purification performance thereof has deteriorated, the pressure difference decreases due to the perforation. Therefore, if the pressure difference is less than the perforation threshold, it is determined that perforation of the exhaust gas control device has occurred.

If it is determined that a malfunction, for example, clogging or perforation of the exhaust gas control device has occurred, the exhaust gas control device is replaced with a new one.

As the accumulated hours of use of the exhaust gas control device increase, the exhaust gas control device deteriorates. As the degree of deterioration increases, a malfunction is more likely to occur. If the degree of deterioration of the exhaust gas control device falls within a certain range of degree of deterioration, the exhaust gas control device is able to purify the exhaust gas. The threshold, which is used to determine whether the exhaust gas control device malfunctions, may be set to a value that corresponds to the upper limit of the range so that a malfunction of the exhaust gas control device is reliably detected. In this case, if it is determined that the exhaust gas control device malfunctions based on the fact that the parameter that indicates the exhaust gas purification performance of the exhaust gas control device crosses the threshold before the degree of deterioration of the exhaust gas control device reaches the upper limit, the determination is regarded as being appropriate.

However, if the threshold is set in the above-described manner, the following inconvenience occurs when the degree of deterioration of the exhaust gas control device is low, for example, when the exhaust gas control device is nearly new When the degree of deterioration of the exhaust gas control device is low, a malfunction of the exhaust gas control device is unlikely to occur. Therefore, if the threshold that is set in the above-described manner is used to determine whether the exhaust gas control device malfunctions, the likelihood that the exhaust gas control device is determined to be malfunctioning is significantly increased. Accordingly, even if it is determined that the exhaust gas control device malfunctions based on the fact that the parameter crosses the threshold, a serious malfunction that may cause a problem has actually not occurred. That is, an erroneous determination is made. In this case, the exhaust gas control device is replaced with a new one based on the erroneous determination that the malfunction has occurred, before the degree of deterioration of the exhaust gas control device reaches the upper limit. As a result, the exhaust gas control device is replaced with a new one unnecessarily early.

SUMMARY OF THE INVENTION

The invention relates to malfunction diagnostic device for an exhaust gas control device, which makes it possible to avoid the situation where an erroneous determination that the exhaust gas control device malfunctions is made when the degree of deterioration of the exhaust gas control device is low, and to accurately determine whether the exhaust gas control device malfunctions.

A first aspect of the invention relates to a malfunction diagnostic device for an exhaust gas control device, which includes: a malfunction determination unit that determines that an exhaust gas control device provided in an exhaust system of an internal combustion engine malfunctions when a parameter that indicates exhaust gas purification performance of the exhaust gas control device crosses a threshold; a deterioration determination unit that determines the degree of deterioration of the exhaust gas control device; and a variable threshold setting unit that adjusts the threshold based on the degree of deterioration of the exhaust gas control device in such a manner that the likelihood that the exhaust gas control device is determined to be malfunctioning is lower at lower degrees of deterioration of the exhaust gas control device.

According to the first aspect of the invention, the initial value of the threshold is set to the value that corresponds to the state where the exhaust gas control device is new, and is gradually changed from the value that corresponds to the state where the exhaust gas control device is new in such a manner that the likelihood that the exhaust gas control device is determined to be malfunctioning is increased. Therefore, when the degree of deterioration of the exhaust gas control device is low, that is, when a malfunction of the exhaust gas control device is unlikely to occur, if the threshold that is variably set in the above-described manner is used to determine whether the exhaust gas control device malfunctions, it is possible to avoid the situation where the likelihood that the exhaust gas control device is determined to be malfunctioning is significantly increased. Accordingly, it is possible to avoid the situation where the parameter crosses the threshold and an erroneous determination that the exhaust gas control device malfunctions is made although the degree of deterioration of the exhaust gas control device is low and serious malfunction that may cause a problem has actually not occurred. As the degree of deterioration of the exhaust gas control device increases from the value that corresponds to the state where the exhaust gas control device is new, that is, as a malfunction of the exhaust gas control device is more likely to occur, the threshold is changed in such a manner that the likelihood that the exhaust gas control device is determined to be malfunctioning is increased. Accordingly, if a serious malfunction of the exhaust gas control device that may cause a problem occurs before the degree of deterioration of the exhaust gas control device reaches the upper limit, the parameter reliably crosses the threshold and it is determined that the exhaust gas control device malfunctions based on this fact. Therefore, the determination is regarded as being appropriate. With this configuration, it is possible to avoid the situation where an erroneous determination that the exhaust gas control device malfunctions is made when the degree of deterioration of the exhaust gas control device is low, and to accurately determine whether the exhaust gas control device malfunctions.

In the first aspect of the invention, when the exhaust gas control device is new, the variable threshold setting unit may set the threshold to a value that corresponds to a state where the exhaust gas control device is new. As the degree of deterioration of the exhaust gas control device increases, the variable threshold setting unit may gradually change the threshold from the value that corresponds to the state where the exhaust gas control device is new in such a manner that the likelihood that the exhaust gas control device is determined to be malfunctioning increases. The variable threshold setting unit may set the limit value of the threshold, at which the threshold stops changing, to a value that corresponds to the upper limit of a certain range of degree of deterioration of the exhaust gas control device, in which the exhaust gas control device is able to purify exhaust gas.

With the configuration described above, when the degree of deterioration of the exhaust gas control device is low, the threshold is set to a value that is equal to or close to the value that corresponds to the state where the exhaust gas control device is new. Therefore, if the threshold that is variably set in the above-described manner is used to determine whether the exhaust gas control device malfunctions, it is possible to avoid the situation where the likelihood that the exhaust gas control device is determined to be malfunctioning is significantly increased. As the degree of deterioration of the exhaust gas control device increases, the threshold is gradually changed in such a manner that the likelihood that the exhaust gas control device is determined to be malfunctioning increases. When the degree of deterioration of the exhaust gas control device falls within the certain range, the exhaust gas control device is able to purify the exhaust gas. The limit value of the threshold, at which the threshold stops changing, is set to the value that corresponds to the upper limit of the certain range. Accordingly, for example, when the degree of deterioration of the exhaust gas control device is high, if a serious malfunction of the exhaust gas control device that may cause a problem occurs, the parameter that indicates the exhaust gas purification performance of the exhaust gas control device reliably crosses the threshold and it is determined that the exhaust gas control device malfunctions based on this fact. Therefore, the determination is regarded as being appropriate.

In the above-described configuration, the variable threshold setting unit may set the amount of change in the threshold per unit amount of change in the degree of deterioration of the exhaust gas control device in such a manner that the amount of change in the threshold is decreased as the degree of deterioration approaches the upper limit of the certain range.

The influence of the increase in the degree of deterioration of the exhaust gas control device on occurrence of a malfunction of the exhaust gas control device is the greatest when the exhaust gas control device is new, and decreases as the exhaust gas control device deteriorates. Based on this characteristic, the threshold is variably set based on the degree of deterioration of the exhaust gas control device. That is, the amount of change in the threshold per unit amount of change in the degree of, deterioration of the exhaust gas control device when the degree of deterioration increases toward the upper limit is set in such a manner that amount of change in the threshold is decreased as the degree of deterioration approaches the upper limit. Therefore, the threshold is changed based on the increase in the degree of deterioration of the exhaust gas control device in the optimum manner that is adopted with the above-described characteristic taken into account.

In the first aspect of the invention, the parameter that indicates the exhaust gas purification performance of the exhaust gas control device may be the pressure difference between the upstream side of the exhaust gas control device and the downstream side of the exhaust gas control device in the exhaust system of the internal combustion engine. When the pressure difference is less than a perforation threshold, which is variably set as the threshold by the variable threshold setting unit so as to increase as the degree of deterioration of the exhaust gas control device increases, the malfunction determination unit may determine that perforation of the exhaust gas control device has occurred.

With the configuration described above, the perforation threshold is variably set in such a manner that the likelihood that the exhaust gas control device is determined to be perforated is increased as the degree of deterioration of the exhaust gas control device increases based on the fact that perforation of the exhaust gas control device is more likely to occur as the degree of deterioration of the exhaust gas control device increases. Also, the pressure difference between the upstream side of the exhaust gas control device and the downstream side of the exhaust gas control device is used as the parameter that indicates the exhaust gas purification performance of the exhaust gas control device. This is because the pressure difference tends to decrease as the degree of deterioration of the exhaust gas control device increases with an increase in the degree of perforation of the exhaust gas control device.

When the degree of deterioration of the exhaust gas control device is low, that is, when perforation of the exhaust gas control device is unlikely to occur, if the perforation threshold that is variably set in the above-described manner is used to determine whether perforation of the exhaust gas control device has occurred, it is possible to avoid the situation where the likelihood that the exhaust gas control device is determined to be perforated is significantly increased. Accordingly, it is possible to avoid the situation where the pressure difference falls below the perforation threshold and an erroneous determination that perforation of the exhaust gas control device has occurred is made although the degree of deterioration of the exhaust gas control device is low and serious perforation that may cause a problem has actually not occurred.

As the degree of deterioration of the exhaust gas control device increases from the value that corresponds to the state where the exhaust gas control device is new, that is, as perforation of the exhaust gas control device is more likely to occur, the perforation threshold is increased so that the likelihood that the exhaust gas control device is determined to be perforated is increased. Accordingly, if serious perforation of the exhaust gas control device that may cause a problem occurs before the degree of deterioration of the exhaust gas control device reaches the upper limit, the pressure difference reliably falls below the perforation threshold and it is determined that perforation of the exhaust gas control device has occurred based on this fact. Therefore, the determination is regarded as being appropriate.

With this configuration, it is possible to avoid the situation where an erroneous determination that perforation of the exhaust gas control device has occurred is made when the degree of deterioration of the exhaust gas control device is low, and to accurately determine whether perforation of the exhaust gas control device has occurred.

In the first aspect of the invention, the parameter that indicates the exhaust gas purification performance of the exhaust gas control device may be the pressure difference between the upstream side of the exhaust gas control device and the downstream side of the exhaust gas control device in the exhaust system of the internal combustion engine. When the pressure difference is equal to or greater than a clogging threshold, which is variably set as the threshold by the variable threshold setting unit so as to decrease as the degree of deterioration of the exhaust gas control device increases, the malfunction determination unit may determine that clogging of the exhaust gas control device has occurred.

With the configuration described above, the clogging threshold is variably set in such a manner that the likelihood that the exhaust gas control device is determined to be clogged is increased as the degree of deterioration of the exhaust gas control device increases based on the fact that clogging of the exhaust gas control device is more likely to occur as the degree of deterioration of the exhaust gas control device increases. Also, the pressure difference between the upstream side of the exhaust gas control device and the downstream side of the exhaust gas control device is used as the parameter that indicates the exhaust gas purification performance of the exhaust gas control device. This is because the pressure difference tends to increase as the degree of deterioration of the exhaust gas control device increases with an increase in the degree of clogging of the exhaust gas control device.

When the degree of deterioration of the exhaust gas control device is low, that is, when clogging of the exhaust gas control device is unlikely to occur, if the clogging threshold that is variably set in the above-described manner is used to determine whether clogging of the exhaust gas control device has occurred, it is possible to avoid the situation where the likelihood that the exhaust gas control device is determined to be clogged is significantly increased. Accordingly, it is possible to avoid the situation where the pressure difference exceeds the clogging threshold and an erroneous determination that clogging of the exhaust gas control device has occurred is made although the degree of deterioration of the exhaust gas control device is low and serious clogging that may cause a problem has actually not occurred.

As the degree of deterioration of the exhaust gas control device increases from the value that corresponds to the state where the exhaust gas control device is new, that is, as clogging of the exhaust gas control device is more likely to occur, the clogging threshold is decreased so that the likelihood that the exhaust gas control device is determined to be clogged is increased. Accordingly, if serious clogging of the exhaust gas control device that may cause a problem occurs before the degree of deterioration of the exhaust gas control device reaches the upper limit, the pressure difference reliably exceeds the clogging threshold and it is determined that clogging of the exhaust gas control device has occurred based on this fact. Therefore, the determination is regarded as being appropriate.

With this configuration, it is possible to avoid the situation where an erroneous determination that clogging of the exhaust gas control device has occurred is made when the degree of deterioration of the exhaust gas control device is low, and to accurately determine whether clogging of the exhaust gas control device has occurred.

In the first aspect of the invention, the exhaust gas control device may include a catalyst, and, the exhaust gas purification performance of the exhaust gas control device may be recovered through a temperature increasing control for increasing a catalyst bed temperature of the catalyst. The parameter that indicates the exhaust gas purification performance of the exhaust gas control device may be the catalyst bed temperature when the temperature increasing control is executed. When the catalyst bed temperature is lower than an insufficient temperature increase threshold, which is variably set as the threshold by the variable threshold setting unit so as to increase as the degree of deterioration of the exhaust gas control device increases, the malfunction determination unit may determine that insufficient temperature increase in the exhaust gas control device has occurred.

With the configuration described above, the insufficient temperature increase threshold is variably set in such a manner that the likelihood that temperature increase In the exhaust gas control device is determined to be insufficient is increased as the degree of deterioration of the exhaust gas control device increases based on the fact that insufficient temperature increase in the exhaust gas control device is more likely to occur as the degree of deterioration of the exhaust gas control device increases. Also, the catalyst bed temperature of the exhaust gas control device when the temperature increasing control is executed is used as the parameter that indicates the exhaust gas purification performance of the exhaust gas control device. This is because the catalyst bed temperature tends to decrease as the degree of deterioration of the exhaust gas control device increases with an increase in the degree of insufficiency of the temperature increase in the exhaust gas control device.

When the degree of deterioration of the exhaust gas control device is low, that is, when insufficient temperature increase in the exhaust gas control device is unlikely to occur, if the insufficient temperature increase threshold that is variably set in the above-described manner is used to determine whether insufficient temperature increase in the exhaust gas control device has occurred, it is possible to avoid the situation where the likelihood that the temperature increase in the exhaust gas control device is determined to be insufficient is significantly increased. Accordingly, it is possible to avoid the situation where the catalyst bed temperature falls below the insufficient temperature increase threshold and an erroneous determination that insufficient temperature increase in the exhaust gas control device has occurred is made although the degree of deterioration of the exhaust gas control device is low and significantly-insufficient temperature increase that may cause a problem has actually not occurred.

As the degree of deterioration of the exhaust gas control device increases from the value that corresponds to the state where the exhaust gas control device is new, that is, as insufficient temperature increase in the exhaust gas control device is more likely to occur, the insufficient temperature increase threshold is increased so that the likelihood that the temperature increase in the exhaust gas control device is determined to be insufficient is increased. Accordingly, if significantly-insufficient temperature increase that may cause a problem occurs before the degree of deterioration of the exhaust gas control device reaches the upper limit, the catalyst bed temperature reliably falls below the insufficient temperature increase threshold and it is determined that insufficient temperature increase in the exhaust gas control device has occurred based on this fact. Therefore, the determination is regarded as being appropriate.

With this configuration, it is possible to avoid the situation where an erroneous determination that insufficient temperature increase in the exhaust gas control device has occurred is made when the degree of deterioration of the exhaust gas control device is low, and to accurately determine whether insufficient temperature increase in the exhaust gas control device has occurred.

A second aspect of the invention relates to a malfunction diagnostic method for an exhaust gas control device. According to the malfunction diagnostic method, the degree of deterioration of an exhaust gas control device provided in an exhaust system of an internal combustion engine is detected, and a threshold for a parameter that indicates exhaust gas purification performance of the exhaust gas control device is adjusted in such a manner that the likelihood that the exhaust gas control device is determined to be malfunctioning is lower at lower degrees of deterioration of the exhaust gas control device. When the parameter crosses the threshold, It is determined that the exhaust gas control device malfunctions.

BRIEF DESCRIPTION OF THE DRAWINGS

The features, advantages and technical and industrial significance of this invention will be described in the following detailed description of example embodiments of the invention with reference of the accompanying drawings, wherein the same or corresponding portions will be denoted by the same reference numerals and wherein:

FIG. 5 is a flowchart used to determine whether clogging of the PM filter has occurred;

FIG. 6 is a graph showing the manner in which an insufficient temperature increase threshold is changed in accordance with a change in a mileage in a third embodiment of the invention; and FIG. 7 is a flowchart used to determine whether insufficient temperature increase in a first catalytic converter and a second catalytic converter has occurred.

DETAILED DESCRIPTION OF THE EMBODIMENTS

Hereafter, a malfunction diagnostic device according to example embodiments of the invention will be described with reference to FIGS. 1 to 7. In the example embodiments, the malfunction diagnostic device is applied to an exhaust gas control apparatus for an internal combustion engine for an automobile.

Figure 1:
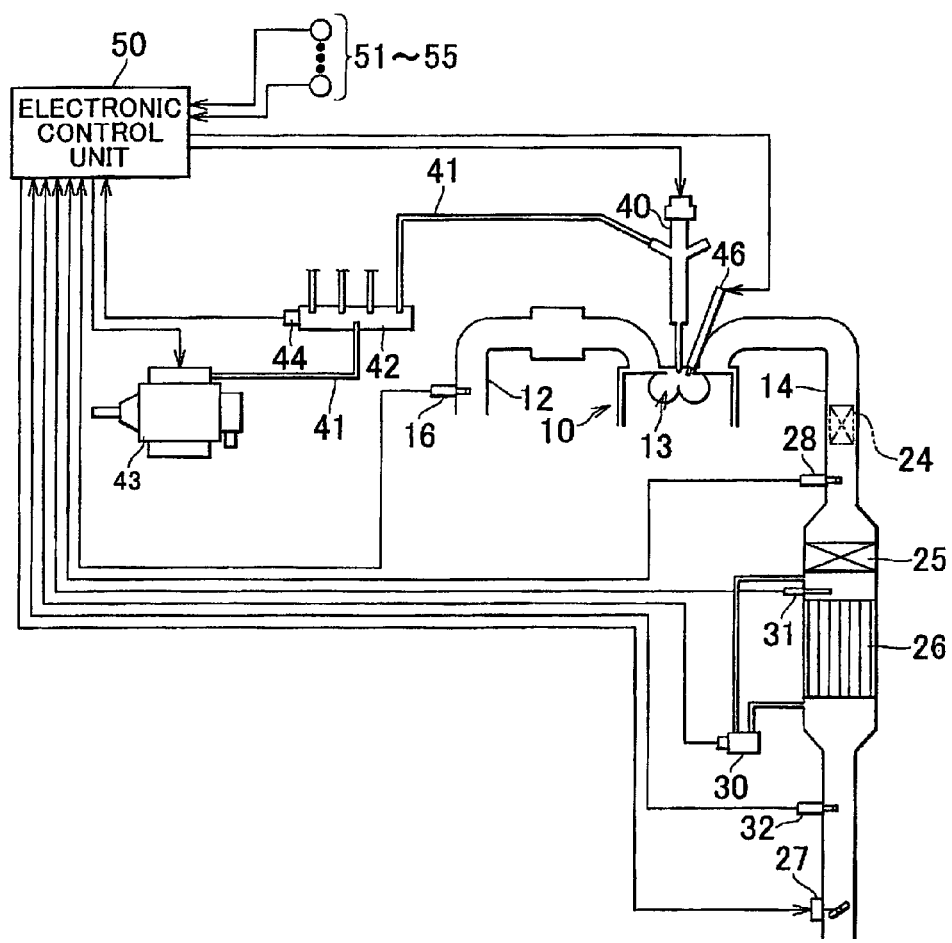
FIG. 1 is a view schematically showing an internal combustion engine and an exhaust gas control apparatus for the Internal combustion engine, to which a malfunction diagnostic device for an exhaust gas control device according to a first embodiment of the invention is applied.

First, a first embodiment of the invention will be described. FIG. 1 shows the structure of an internal combustion engine 10 and an exhaust gas control apparatus for the internal combustion engine to which a malfunction diagnostic device for an exhaust gas control device according to the first embodiment of the invention is applied. The internal combustion engine 10 is a diesel engine that includes a common-rail fuel injection device.

An intake passage 12 that forms an intake system of the internal combustion engine 10 and an exhaust passage 14 that forms an exhaust system of the internal combustion engine 10 are connected to combustion chambers 13 of cylinders in the internal combustion engine 10. An airflow meter 16 is provided in the intake passage 12. A first catalytic converter 24, a second catalytic converter 25, a PM filter 26 and an exhaust throttle valve 27 are provided in the exhaust passage 14 from the upstream side in this order.

The first catalytic converter 24 and the second catalytic converter 25 each support an oxidative catalyst, and the oxidative catalyst oxidizes hydrocarbon (HC) and carbon monoxide (CO) in the exhaust gas to remove them from the exhaust gas. The PM filter 26 is made of porous material, and traps particulate matter (PM), composed mainly of soot, in the exhaust gas. The first catalytic converter 24, the second catalytic converter 25, and the PM filter 26 function as exhaust gas control devices that purify the exhaust gas discharged from the engine 1.

In the exhaust passage 14, a first exhaust gas temperature sensor 28, which detects the temperature of the exhaust gas flows from the first catalytic converter 24 to the second catalytic converter 25, is provided between the first catalytic converter 24 and the second catalytic converter 25. In the exhaust passage 14, a second exhaust gas temperature sensor 31, which detects the temperature of the exhaust gas that flows from the second catalytic converter 25 to the PM filter 26, is provided between the second catalytic converter 25 and the PM filter 26. A pressure difference sensor 30, which detects the difference in pressure between the upstream side and the downstream side of the PM filter 26, is provided in the exhaust passage 14. An air-fuel ratio sensor 32, which detects the air-fuel ratio, is provided in the exhaust passage 14 at a position downstream of the PM filter 26.

Each of the cylinders of the internal combustion engine 10 is provided with an injector 40 that injects the fuel into the combustion chamber 13, and a glow plug 46 that is energized to warm up the combustion chamber 13 so that the startability of the internal combustion engine 10 is improved. The injector 40 of each cylinder is connected to a common-rail 42 via a high-pressure fuel supply pipe 41. The high-pressure fuel is supplied to the common-rail 42 via a fuel pump 43. The pressure of the high-pressure fuel in the common rail 42 is detected by a rail pressure sensor 44 fitted to the common-rail 42.

An electronic control unit 50 executes various controls over the internal combustion engine 10. The electronic control unit 50 includes a CPU that executes various computation processes for an engine control, a ROM that stores programs and data that are necessary to execute the control, a RAM that temporarily stores, for example, the results of computation executed by the CPU, an input port into which signals from external devices are input, an output port from which signal to external devices are output, etc.

In addition to the above-described sensors, an engine speed sensor 51 that detects the engine speed, an accelerator pedal operation amount sensor 52 that detects the operation amount of an accelerator pedal, an intake air temperature sensor 54 that detects the temperature of the air taken in the internal combustion engine 10, a coolant temperature sensor 55 that detects the temperature of a coolant for the internal combustion engine 10, etc. are connected to the input port of the electronic control unit 50.

The electronic control unit 50 outputs command signals to drive circuits for the various devices connected to the output port based on the engine operating state that is determined based on the signals from the various sensors described above. Thus, the electronic control unit 50 executes various controls such as the control over the amount, the injection timing and the pressure of the fuel that is injected from the injectors 40, the energization control over the glow plugs 46, and the control for opening and closing the exhaust throttle valve 27.

In the thus structured internal combustion engine 10 and exhaust gas control apparatus for the internal combustion engine 10, the exhaust gas purification performance of the exhaust gas control devices (mainly, the PM filter 26) is reduced by clogging due to PM. Therefore, a filter recovery process, in which the PM accumulated in the exhaust gas control device is burned, is executed. As a result, clogging of the exhaust gas control device due to the accumulated PM is eliminated so that the exhaust gas purification performance is recovered. In order to recover the filter, the temperatures of the exhaust gas control devices such as the first catalytic converter 24, the second catalytic converter 25, and the PM filter 26 need to be increased to sufficiently high temperatures. Therefore, in the filter recovery process, a temperature increasing control is executed to increase the temperatures of the exhaust gas control devices such as the first catalytic converter 24, the second catalytic converter 25 and the PM filter 26 to values that need to be achieved to burn the PM (e.g. 600° C. to 700° C.).

The amount of PM accumulated in, for example, the PM filter 26 is estimated based on the pressure difference $\Delta p$ between the upstream side and the downstream side of the PM filter 26, which is detected by the pressure difference sensor 30. If the estimated amount of accumulated PM (hereinafter, referred to as "accumulated PM amount" where appropriate) is equal to or greater than a permissible upper limit, the filter recovery process is started. The accumulated PM amount is estimated based on the pressure difference $\Delta p$ that is detected by the pressure difference sensor 30 because the pressure difference $\Delta p$ increases as the accumulated PM amount increases. When the filter recovery process is started, a control for supplying unburned fuel components to the first catalytic converter 24 and the second catalytic converter 25 is executed as the above-described temperature increasing control. Then, the temperature of the PM filter 26 is increased to a value that need to be achieved to burn the PM by the heat that is generated when the fuel is oxidized by the catalysts of the catalytic converters 24 and 25.

More specifically, the unburned fuel components are supplied to the first catalytic converter 24 and the second catalytic converter 25 by post-injection that is fuel injection from the injectors 40 and that is performed after main-injection. The main-injection is fuel injection, from the injectors 40 to the combustion chambers 13, which is performed to operate the engine. The fuel injected from the injectors 40 by the post-injection is delivered to the exhaust passage 14 and reaches the first catalytic converter 24. When the unburned fuel components reach the first catalytic converter 24, oxidation reaction of the components such as hydrocarbon (HC) and carbon monoxide (CO) occurs in the exhaust gas or on the catalyst, and the temperature of the exhaust gas is increased by the heat generated by the oxidation reaction. In addition, the temperature of the second catalytic converter 25 is increased due to the increase in the temperature of the exhaust gas. Thus, activation of the second catalytic converter 25 is promoted. When the unburned fuel components that have passed through the first catalytic converter 24 without being oxidized reach the second catalytic converter 25, oxidation reaction of the unburned fuel components occurs at the second catalytic converter 25, and the temperature of the exhaust gas is increased by the heat generated by the oxidation reaction. Then, the exhaust gas of which the temperature has been increased flows into the PM filter 26, whereby the temperature of the PM filter 26 is increased to a value that is high enough to burn the PM.

When the filter recovery process is executed in this manner, the PM accumulated in the PM filter 26 is burned and the amount of PM accumulated in the PM filter 26 decreases. When the estimated amount of PM accumulated In the PM filter 26 is decreased to a sufficiently small amount by executing the filter recovery process, for example, when the estimated amount of PM accumulated in the PM filter 26 becomes substantially equal to zero, it is determined that recovery of the filter is completed and the post-injection is stopped. When the post-injection is stopped, the filter recovery process (temperature increasing control) is completed. When the temperature increasing control is executed to recover the filter, the unburned fuel components are supplied to the first catalytic converter 24 and the second catalytic converter 25. In addition to this, for example, the idling speed may be increased while the internal combustion engine 10 is idling, the opening amount of the exhaust throttle valve 27 may be reduced, and the glow plugs 46 may be energized in order to increase the temperature of the exhaust gas that is discharged from the internal combustion engine 10.

Next, a malfunction diagnosis for the exhaust gas control devices such as the first catalytic converter 24, the second catalytic converter 25 and the PM filter 26 will be described. In the malfunction diagnosis for the exhaust gas control devices, whether the exhaust gas control devices malfunction is determined based on the parameters that indicate the exhaust gas purification performance of the exhaust gas control devices for the internal combustion engine 10. If the parameter crosses a predetermined threshold, it is determined that the exhaust gas control device malfunctions. If it is determined that the exhaust gas control device malfunctions, the exhaust gas control device is replaced with a new one.

Examples of malfunctions of the exhaust gas control devices include perforation of the PM filter 26. The perforation of the PM filter 26 may be caused by melting of the PM filter 26 due to an increase in the temperature of the PM filter 26 that occurs, for example, during the filter recovery process. Whether perforation of the PM filter 26 has occurred may be determined by using the pressure difference $\Delta p$, detected by the pressure difference sensor 30 immediately after the filter is recovered, as the parameter. This is because the pressure difference $\Delta p$ tends to decrease as the exhaust gas purification performance of the PM filter 26 is reduced with an increase in the degree of the perforation of the PM filter 26. Note that, the pressure difference $\Delta p$ is influenced by the intake air amount Ga that is the amount of air taken in the internal combustion engine 10 per unit time, and the pressure difference $\Delta p$ tends to exhibits a greater value as the intake air amount Ga increases. The pressure difference $\Delta p$ is divided by the intake air amount Ga to eliminate fluctuations in the pressure difference $\Delta p$ due to the intake air amount Ga, and the pressure difference per unit air amount $\Delta p/Ga$, which is a value derived through the division, is used to determine whether perforation of the PM filter 26 has occurred. The intake air amount Ga is obtained based on a signal from the airflow meter 16. If the pressure difference per unit air amount Δp/Ga is less than the perforation threshold A that is set as the threshold described above, it is determined that perforation of the PM filter 26 has occurred.

As the accumulated hours of use of the exhaust gas control devices such as the first catalytic converter 24, the second catalytic converter 25, and the PM filter 26 increase, these exhaust gas control devices deteriorate. As the degree of deterioration of the devices increases, a malfunction is more likely to occur. The degree of deterioration of the exhaust gas control devices may be expressed by the mileage of the automobile that increases as the accumulated hours of use of the exhaust gas control devices increase. That is, it is considered that the degree of deterioration of the exhaust gas control devices increases as the mileage of the automobile increases.

The manner of setting the perforation threshold A used to determine whether perforation of the PM filter 26 has occurred will be described below. When the degree of deterioration of the PM filter 26 falls within a certain range of degree of deterioration, the PM filter 26 is able to purify the exhaust gas. The perforation threshold A is set to the value a1 (see FIG. 2) that corresponds to the upper limit of the certain range so that perforation of the PM filter 26 is reliably detected. The upper limit of the certain range is expressed by a value of "X" (e.g. 160 thousand kilometers) shown in FIG. 2, if the degree of deterioration is converted into the mileage of the automobile. When the mileage of the automobile reaches the value "X", the pressure difference per unit air amount Δp/Ga falls below the value a1. Therefore, based on the value a1, perforation of the PM filter 26 is reliably detected. In this case, if it is determined that perforation of the PM filter 26 has occurred based on the fact that the pressure difference per unit air amount Δp/Ga falls below the perforation threshold A before the degree of deterioration of the PM filter 26 reaches the upper limit (mileage "X"), the determination is regarded as being appropriate.

However, if the perforation threshold A is set to the value a1 as described above, the following inconvenience occurs when the degree of deterioration of the PM filter 26 is low, for example, when the PM filter 26 is nearly new. When the degree of deterioration of the PM filter 26 is low, perforation of the PM filter 26 is unlikely to occur. Therefore, if the perforation threshold A (a1) is used to determine whether perforation of the PM filter 26 has occurred, the likelihood that the PM filter 26 is determined to be perforated is significantly increased. Accordingly, even if it is determined that perforation of the PM filter 26 has occurred based on the fact that the pressure difference per unit air amount Δp/Ga falls below the perforation threshold A (a1), serious perforation that may cause a problem has actually not occurred. That is, an erroneous determination is made. In this case, the PM filter 26 is replaced with a new one based on the erroneous determination that the perforation of the PM filter 26 has occurred, before the degree of deterioration of the PM filter 26 reaches the upper limit (corresponding to the mileage "X"). As a result, the PM filter 26 is replaced with a new one unnecessarily early.

Figure 2:
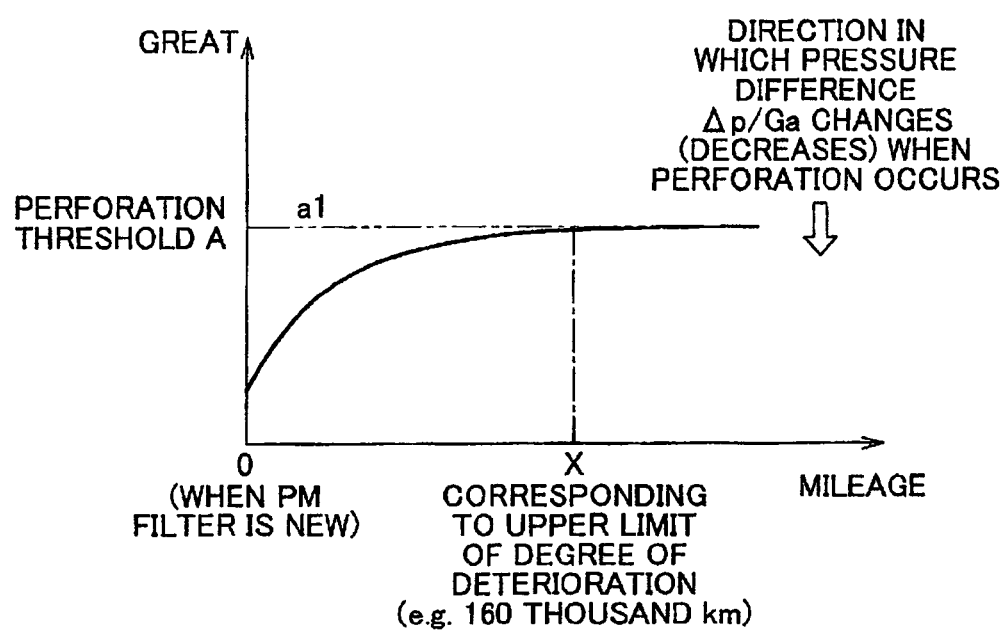
FIG. 2 is a graph showing the manner in which a perforation threshold is changed in accordance with a change in a mileage.

In order to avoid such inconvenience, according to the first embodiment of the invention, the perforation threshold A is variably set in a manner described below based on the mileage of the automobile (corresponding to the degree of deterioration of the PM filter 26). More specifically, the perforation threshold A is variably set based on the degree of deterioration of the PM filter 26 in such a manner that the likelihood that the PM filter 26 is determined to be perforated is lower when the mileage of the automobile and the degree of deterioration of the PM filter 26 are lower, as shown in FIG. 2.

More specifically, when the mileage of the automobile is "0" (when the PM filter 26 is new), the perforation threshold A that corresponds to the state where the mileage of the automobile is "0" is set. As the mileage of the automobile increases, the perforation threshold A is gradually increased from the value that corresponds to the state where the PM filter 26 is new so that the likelihood that the PM filter 26 is determined to be perforated increases. When the degree of deterioration of the PM filter 26 falls within the certain range, the PM filter 26 is able to purify the exhaust gas. The limit value of the perforation threshold A, at which the perforation threshold A stops increasing, is set to a value that corresponds to the upper limit of the certain range (mileage "X"), that is, the value a1. The amount of change in the perforation threshold A per unit change amount of the mileage when the mileage increases from "0" to "X" is set in such a manner that amount of change in the perforation threshold A decreases as the mileage approaches the value "X".

When the degree of deterioration of the PM filter 26 is low, that is, when perforation of the PM filter 26 is unlikely to occur, if the perforation threshold A that is variably set in the above-described manner is used to determine whether perforation of the PM filter 26 has occurred, it is possible to avoid the situation where the likelihood that the PM filter 26 is determined to be perforated is significantly. increased. Accordingly, it is possible to avoid the situation where the pressure difference per unit air amount Δp/Ga falls below the perforation threshold. A and an erroneous determination that perforation of the PM filter 26 has occurred is made although the degree of deterioration of the PM filter 26 is low and serious perforation that may cause a problem has actually not occurred. As the degree of deterioration of the PM filter 26 increases from the value that corresponds to the state where the PM filter 26 is new, that is, as perforation of the PM filter 26 is more Likely to occur, the perforation threshold A is changed (increased) in such a manner that the likelihood that the PM filter 26 is determined to be perforated is increased. Accordingly, if serious perforation of the PM filter 26 that may cause a problem occurs before the degree of deterioration of the PM filter 26 reaches the upper limit, the pressure difference per unit air amount Δp/Ga reliably falls below the perforation threshold A and it is determined that perforation of the PM filter 26 has occurred based on this fact. Therefore, the determination is regarded as being appropriate. With this configuration, it is possible to avoid the situation where an erroneous determination that perforation of the PM filter 26 has occurred is made when the degree of deterioration of the PM filter 26 is low, and to accurately determine whether perforation of the PM filter 26 has occurred.

Figure 3:
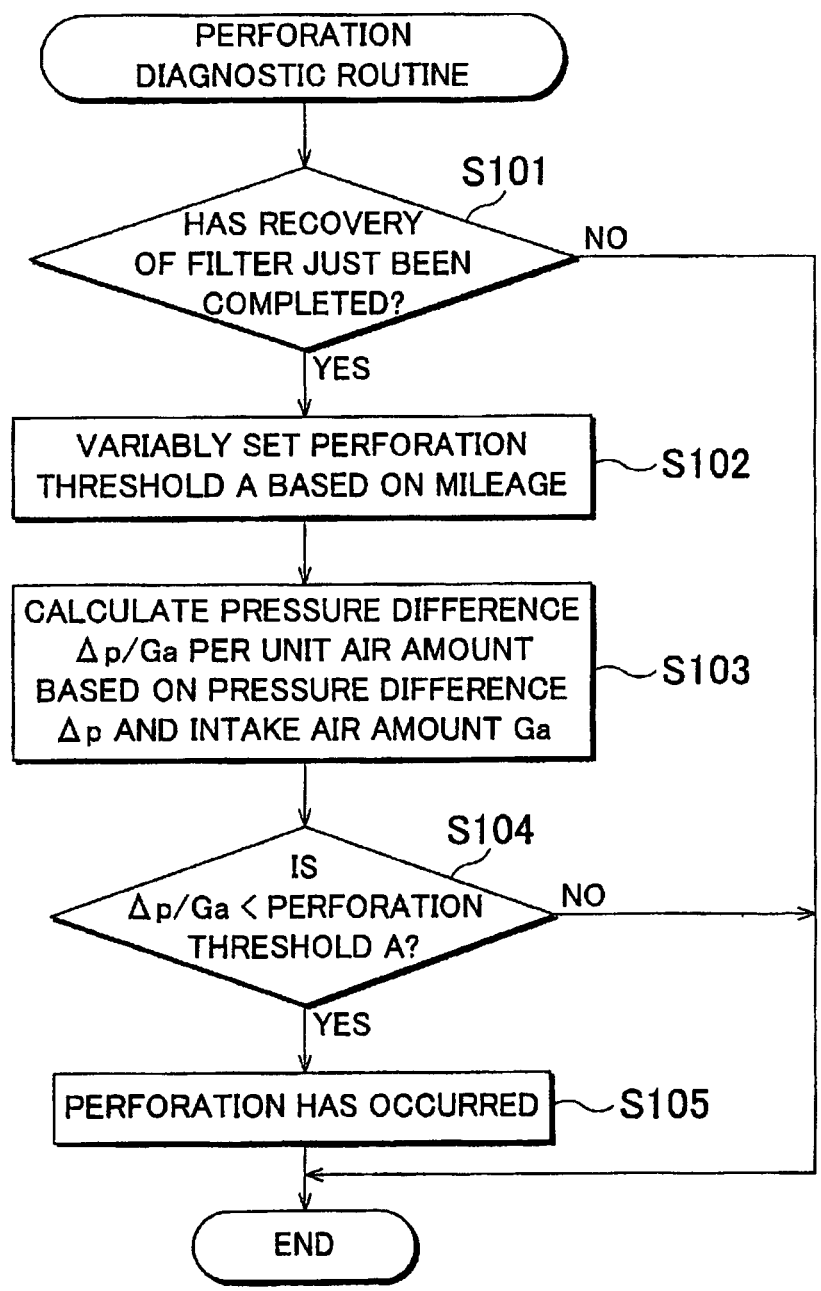
FIG. 3 is a flowchart used to determine whether perforation of a PM filter has occurred.

FIG. 3 is a flowchart showing a perforation determination routine used to determine whether perforation of the PM filter 26 has occurred. The perforation determination routine is an interrupt routine that is executed by the electronic control unit 50 at predetermined time intervals.

In the perforation determination routine, if it is determined that recovery of the filter has just been, completed ("YES" in S101), the perforation threshold A is variably set as indicated by the solid line in FIG. 2 based on the mileage of the automobile (S102), and the pressure difference per unit air amount Δp/Ga is calculated based on the pressure difference Δp and the intake air amount Ga (S103). Then, if the pressure difference per unit air amount Δp/Ga is less than the perforation threshold A ("YES" in S104), it is determined that perforation of the PM filter 26 has occurred (S105). If it is determined that perforation of the PM filter 26 has occurred, an alarm lamp provided at the driver's seat of the automobile is illuminated after the perforation determination routine ends. If the alarm lamp illuminates, the PM filter 26 is replaced with a new one.

According to the first embodiment of the invention described above, the following effects are produced. 1) The perforation threshold A used to determine whether perforation of the PM filter 26 has occurred is variably set as indicated by the solid line in FIG. 2 based on the mileage of the automobile that increases as the degree of deterioration of the PM filter 26 increases. It the perforation threshold A is variably set in the above-described manner, it is possible to avoid the situation where an erroneous determination that perforation of the PM filter 26 has occurred is made when the degree of deterioration of the PM filter 26 is low, and to accurately determine whether perforation of the PM filter 26 has occurred.

2) When the degree of deterioration of the PM filter 26 is low, the perforation threshold A is set to a value that is equal to or close to a value that corresponds to the state where the PM filter 26 is new Therefore, if the perforation threshold A that is variably set in the above-described manner is used to determine whether perforation of the PM filter 26 has occurred, it is possible to avoid the situation where the likelihood that the PM filter 26 is determined to be perforated is significantly increased. As the degree of deterioration of the PM filter 26 increases, the perforation threshold A is gradually increased so that the likelihood that the PM filter 26 is determined to be perforated increases. When the degree of deterioration of the PM filter 26 falls within the certain range, the PM filter 26 is able to purify the exhaust gas. The limit value of the perforation threshold A, at which the perforation threshold A stops changing, is set to the value a1 that corresponds to the upper limit of the certain range (mileage "X"). Accordingly, for example, when the degree of deterioration of the PM filter 26 is high, if serious perforation of the PM filter 26 that may cause a problem occurs, the pressure difference per unit air amount $\Delta p/Ga$ reliably falls below the perforation threshold A and it is determined that perforation of the PM filter 26 has occurred based on this fact. Therefore, the determination is regarded as being appropriate.

3) The influence of the increase in the degree of deterioration of the PM filter 26 on occurrence of perforation of the PM filter 26 is the greatest when the PM filter 26 is new, and decreases as the PM filter 26 deteriorates. Based on this characteristic, the perforation threshold A is variably set based on the degree of deterioration of the PM filter 26 (corresponding to the mileage of the automobile). That is, the amount of change in the perforation threshold A per unit change amount of the mileage when the mileage increases from "0" to "X" is set in such a manner that amount of change in the perforation threshold A decreases as the mileage approaches the value "X". Therefore, the perforation threshold A is changed based on the increase in the degree of deterioration of the PM filter 26 (corresponding to the mileage of the automobile) in the optimum manner that is adopted with the above-described characteristic taken into account.

4) Whether perforation of the PM filter 26 has occurred is determined immediately after completion of recovery of the PM filter 26 and in the state where the greatest possible amount of PM is removed from the PM filter 26. Therefore, it is possible to increase the accuracy of the determination as to whether perforation of the PM filter 26 has occurred.

Next, a second embodiment of the invention will be described with reference to FIGS. 4 and 5. In the malfunction diagnosis for the exhaust gas control device according to the second embodiment of the invention, whether clogging of the PM filter 26 has occurred is determined. Clogging of the PM filter 26 occurs because the PM that cannot be removed by recovery of the PM filter 26 remains and accumulates, for example, at the front end of the PM filter 26.

Whether clogging of the PM filter 26 has occurred is determined based on the parameter that indicates the exhaust gas purification performance of the exhaust gas control device (PM filter 26). More specifically, the pressure difference $\Delta p$ that is detected by the pressure difference sensor 30 immediately after completion of recovery of the PM filter 26 is used as, the parameter. This is because the pressure difference $\Delta p$ tends to increase as the exhaust gas purification performance of the PM filter 26 is reduced with the increase in the degree of the clogging of the PM filter 26. If the pressure difference per unit air amount $\Delta p/Ga$, which is a value obtained by dividing the pressure difference $\Delta p$ by the intake air amount Ga, is greater than the clogging threshold B that is set as the threshold used to determine whether clogging of the PM filter 26 has occurred, it is determined that clogging of the PM filter 26 has occurred. The clogging threshold B is set to a value that is greater than the perforation threshold A used in the first embodiment of the invention.

Figure 4:
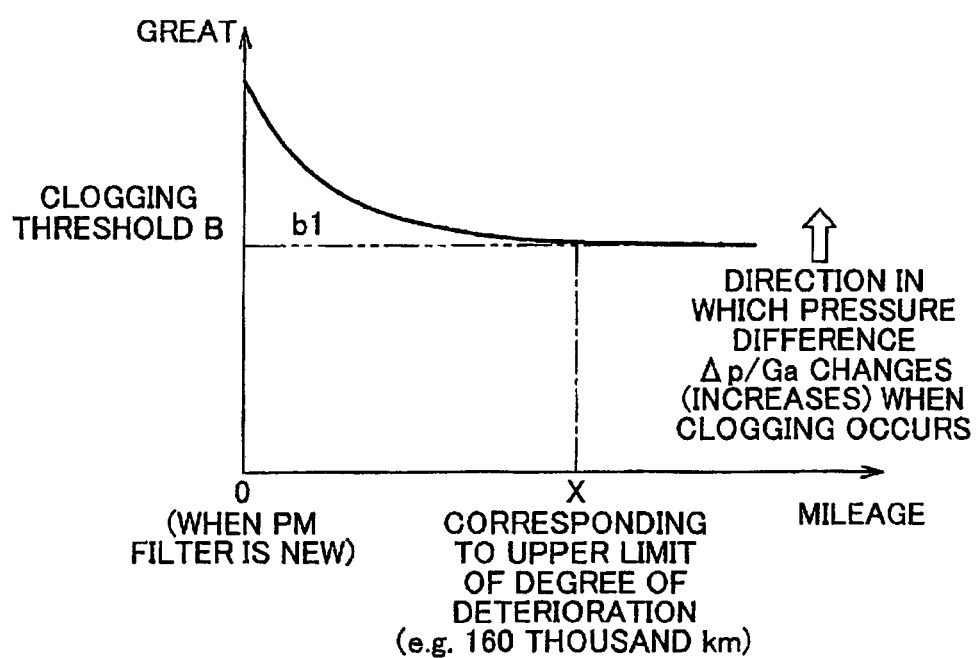
FIG. 4 is a graph showing the manner in which a clogging threshold is changed in accordance with a change in a mileage in a second embodiment of the invention.

FIG. 4 is a graph showing the manner of setting the clogging threshold B used to determine whether clogging of the PM filter 26 has occurred. When the degree of deterioration of the PM filter 26 falls within the certain range of degree of deterioration, the PM filter 26 is able to purify the exhaust gas. The clogging threshold B is set to the value b1 that corresponds to the upper limit of the certain range so that clogging of the PM filter 26 is reliably detected. The upper limit of the certain range is expressed by a value of "X" (e.g. 160 thousand kilometers) shown in FIG. 4, if the degree of deterioration of the PM filter 26 is converted into the mileage of the automobile. When the mileage of the automobile reaches the value "X", the pressure difference per unit air amount $\Delta p/Ga$ exceeds the value b1. Therefore, based on the value b1, clogging of the PM filter 26 is reliably detected. In this case, if it is determined that clogging of the PM filter 26 has occurred based on the fact that the pressure difference per unit air amount $\Delta p/Ga$ exceeds the clogging threshold B before the degree of deterioration of the PM filter 26 reaches the upper limit (mileage "X"), the determination is regarded as being appropriate.

However, if the clogging threshold B is set to the value b1 as described above, the following inconvenience occurs when the degree of deterioration of the PM filter 26 is low, for example, when the PM filter 26 is nearly new. When the degree of deterioration of the PM filter 26 is low, clogging of the PM filter 26 is unlikely to occur. Therefore, if the clogging threshold B (b1) that is set in the above-described manner is used to determine whether clogging of the PM filter 26 has occurred, the likelihood that the PM filter 26 is determined to be clogged is significantly increased. Accordingly, even if it is determined that clogging of the PM filter 26 has occurred based on the fact that the pressure difference per unit air amount $\Delta p/Ga$ exceeds the clogging threshold B (b1), serious clogging that may cause a problem has actually not occurred. That is, an erroneous determination is made. In this case, the PM filter 26 is replaced with a new one based on the erroneous determination that the clogging of the PM filter 26 has occurred, before the degree of deterioration of the PM filter 26 reaches the upper limit (corresponding to the mileage "X"). As a result, the PM filter 26 is replaced with a new one unnecessarily early.

In order to avoid such inconvenience, according to the second embodiment of the invention, the clogging threshold B is variably set in a manner described below based on the mileage of the automobile (corresponding to the degree of deterioration of the PM filter 26). More specifically, the clogging threshold B is variably set based on the degree of deterioration of the PM filter 26 in such a manner that the likelihood that the PM filter 26 is determined to be clogged is lower when the mileage of the automobile and the degree of deterioration of the PM filter 26 are lower, as shown in FIG. 4.

More specifically, when the mileage of the automobile is "0" (when the PM filter 26 is new), the clogging threshold B that corresponds to the state where the mileage of the automobile is "0" is set. As the mileage of the automobile increases, the clogging threshold B is gradually decreased from the value that corresponds to the state where the PM filter 26 is new so that the likelihood that the PM filter 26 is determined to be clogged increases. When the degree of deterioration of the PM filter 26 falls within the certain range, the PM filter 26 is able to purify the exhaust gas. The limit value of the clogging threshold B, at which the clogging threshold B stops decreasing, is set to a value that corresponds to the upper limit of the certain range (mileage "X"), that is, the value b1. The amount of change in the clogging threshold B per unit change amount of the mileage when the mileage increases from "0" to "X" is set in such a manner that amount of change in the clogging threshold B decreases as the mileage approaches the value "X".

When the degree of deterioration of the PM filter 26 is low, that is, when clogging of the PM filter 26 is unlikely to occur, if the clogging threshold B that is variably set in the above-described manner is used to determine whether clogging of the PM filter 26 has occurred, it is possible to avoid the situation where the likelihood that the PM filter 26 is determined to be clogged is significantly increased. Accordingly, it is possible to avoid the situation where the pressure difference per unit air amount $\Delta p/Ga$ exceeds the clogging threshold B and an erroneous determination that clogging of the PM filter 26 has occurred is made although the degree of deterioration of the PM filter 26 is low and serious clogging that may cause a problem has actually not occurred. As the degree of deterioration of the PM filter 26 increases from the value that corresponds to the state where the PM filter 26 is new, that is, as clogging of the PM filter 26 is more likely to occur, the clogging threshold B is changed (decreased) in such a manner that the likelihood that the PM filter 26 is determined to be clogged is increased. Accordingly, if serious clogging of the PM filter 26 that may cause a problem occurs before the degree of deterioration of the PM filter 26 reaches the upper limit, the pressure difference per unit air amount $\Delta p/Ga$ reliably exceeds the clogging threshold B and it is determined that clogging of the PM filter 26 has occurred based on this fact. Therefore, the determination is regarded as being appropriate. With this configuration, it is possible to avoid the situation where an erroneous determination that clogging of the PM filter 26 has occurred is made when the degree of deterioration of the PM filter 26 is low, and to accurately determine whether clogging of the PM filter 26 has occurred.

FIG. 5 is a flowchart showing a clogging determination routine used to determine whether clogging of the PM filter 26 has occurred. The clogging determination routine is an interrupt routine that is executed by the electronic control unit 50 at predetermined time intervals.

In the clogging determination routine, if it is determined that recovery of the filter has just been completed ("YES" in S201), the clogging threshold B is variably set as indicated by the solid line in FIG. 4 based on the mileage of the automobile (S202), and the pressure difference per unit air amount $\Delta p/Ga$ is calculated based on the pressure difference $\Delta p$ and the intake air amount Ga (S203). Then, if the pressure difference per unit air amount $\Delta p/Ga$ is equal to or greater than the clogging threshold B ("YES" in S204), it is determined that clogging of the PM filter 26 has occurred (S205). If it is determined that clogging of the PM filter 26 has occurred, an alarm lamp provided at the driver's seat of the automobile is illuminated after the clogging determination routine ends. If the alarm lamp illuminates, the PM filter 26 is replaced with a new one.

According to the second embodiment of the invention described above, the following effects are produced. 5) The clogging threshold B used to determine whether clogging of the PM filter 26 has occurred is variably set as indicated by the solid line in FIG. 4 based on the mileage of the automobile that increases as the degree of deterioration of the PM filter 26 increases. If the clogging threshold B is variably set in the above-described manner, it is possible to avoid the situation where an erroneous determination that clogging of the PM filter 26 has occurred is made when the degree of deterioration of the PM filter 26 is low, and to accurately determine whether clogging of the PM filter 26 has occurred.

6) When the degree of deterioration of the PM filter 26 is low, the clogging threshold 13 is set to a value that is equal to or close to a value that corresponds to the state where the PM filter 26 is new. Therefore, if the clogging threshold B that is variably set in the above-described manner is used to determine whether clogging of the PM filter 26 has occurred, it is possible to avoid the situation where the likelihood that the PM filter 26 is determined to be clogged is significantly increased. As the degree of deterioration of the PM filter 26 increases, the clogging threshold B is gradually decreased so that the likelihood that the PM filter 26 is determined to be clogged increases. When the degree of deterioration of the PM filter 26 falls within the certain range, the PM filter 26 is able to purify the exhaust gas. The limit value of the clogging threshold B, at which the clogging threshold B stops decreasing, is set to the value b1 that corresponds to the upper limit of the certain range (mileage "X"). Accordingly, for example, when the degree of deterioration of the PM filter 26 is high, if serious clogging of the PM filter 26 that may cause a problem occurs, the pressure difference per unit air amount $\Delta p/Ga$ reliably exceeds the clogging threshold B and it is determined that clogging of the PM filter 26 has occurred based on this fact. Therefore, the determination is regarded as being appropriate.

7) The influence of the increase in the degree of deterioration of the PM filter 26 on occurrence of clogging of the PM filter 26 is the greatest when the PM filter 26 is new, and decreases as the PM filter 26 deteriorates. Based on this characteristic, the clogging threshold B is variably set based on the degree of deterioration of the PM filter 26 (corresponding to the mileage of the automobile). That is, the amount of change in the clogging threshold B per unit change amount of the mileage when the mileage increases from "0" to "X" is set in such a manner that amount of change in the clogging threshold B decreases as the mileage approaches the value "X". Therefore, the clogging threshold B is changed based on the increase in the degree of deterioration of the PM filter 26 (corresponding to the mileage of the automobile) in the optimum manner that is adopted with the above-described characteristic taken into account.

8) Whether clogging of the PM filter 26 has occurred is determined immediately after completion of recovery of the PM filter 26 and in the state where the greatest possible amount of PM is removed from the PM filter 26. Therefore, it is possible to increase the accuracy of the determination as to whether clogging of the PM filter 26 has occurred.

Next, a third embodiment of the invention will be described with reference to FIGS. 6 and 7. In the malfunction diagnosis for the exhaust gas control device according to the third embodiment of the invention, whether insufficient temperature increase in the first catalytic converter 24 and the second catalytic converter 25 has occurred is determined. Insufficient temperature increase in the first catalytic converter 24 and the second catalytic converter 25 occurs due to, for example, thermal deterioration of the catalysts that are supported by these catalytic converters 24 and 25.

Whether insufficient temperature increase in the first catalytic converter 24 and the second catalytic converter 25 has occurred is determined based on the parameter that indicates the exhaust gas purification performance of the exhaust gas control devices (the first catalytic converter 24 and the second catalytic converter 25). More specifically, a catalyst bed temperature T of the first catalytic converter 24 and the second catalytic converter 25 when the temperature increasing control is executed is used as the parameter. This is because the catalyst bed temperature T tends to decrease as the exhaust gas purification performance of the catalytic converters 24 and 25 is reduced with an increase in the degree of insufficiency of the temperature increase in the catalytic converters 24 and 25. When the catalyst bed temperature T is lower than the insufficient temperature increase threshold C that is set as the threshold used to determine whether insufficient temperature increase in the first catalytic converter 24 and the second catalytic converter 25 has occurred, it is determined that insufficient temperature increase in the catalytic converters 24 and 25 has occurred. The catalyst bed temperature T is a value that is estimated based on the command value for the amount of fuel that is injected from the injector 40, which is calculated based on the engine operating state, the engine speed that is detected by the engine speed sensor 51, the exhaust gas temperature that is detected by the first exhaust gas temperature sensor 28, the exhaust gas temperature that is detected by the second exhaust gas temperature sensor 31, etc.

FIG. 6 is a graph showing the manner of setting the insufficient temperature increase threshold C used to determine whether insufficient temperature increase in the first catalytic converter 24 and the second catalytic converter 25 has occurred. When the degree of deterioration of the catalytic converters 24 and 25 falls within a certain range of degree of deterioration, the catalytic converters 24 and 25 are able to purify the exhaust gas. The insufficient temperature increase threshold C is set to the value c1 that corresponds to the upper limit of the certain range so that insufficient temperature increase in the first catalytic converter 24 and the second catalytic converter 25 is reliably detected. The upper limit of the certain range is expressed by a value of "X" (e.g. 160 thousand kilometers) shown in FIG. 6, if the degree of deterioration of the catalytic converters 24 and 25 is converted into the mileage of the automobile. When the mileage of the automobile reaches the value "X", the catalyst bed temperature T when the temperature increasing control is executed falls below the value c1. Therefore, based on the value c1, insufficient temperature increase in the first catalytic converter 24 and the second catalytic converter 25 is reliably detected. In this case, if It is determined that insufficient temperature increase in the catalytic converters 24 and 25 has occurred based on the fact that the catalyst bed temperature T falls below the insufficient temperature increase threshold C before the degree of deterioration of the catalytic converters 24 and 25 reaches the upper limit (mileage "X"), the determination is regarded as being appropriate.

However, if the insufficient temperature increase threshold C is set to the value c1 as described above, the following inconvenience occurs when the degree of deterioration of the catalytic converters 24 and 25 is low, for example, when the catalytic converters 24 and 25 are nearly new. When the degree of deterioration of the catalytic converters 24 and 25 is low, insufficient temperature increase in the catalytic converters 24 and 25 is unlikely to occur. Therefore, if the insufficient temperature increase threshold C (c1) that is set in the above-described manner is used to determine whether insufficient temperature increase in the catalytic converters 24 and 25 has occurred, the likelihood that the temperature increase in the catalytic converters 24 and 25 is determined to be insufficient is significantly increased. Accordingly, even if it is determined that insufficient temperature increase in the catalytic converters 24 and 25 has occurred based on the fact that the catalyst bed temperature T when the temperature increasing control is executed falls below the insufficient temperature increase threshold C (c1), significantly-insufficient temperature increase in the catalytic converters 24 and 25 that may cause a problem has actually not occurred. That is, an erroneous determination is made. In this case, the catalytic converters 24 and 25 are replaced with new ones based on the erroneous determination that insufficient temperature increase in the catalytic converters 24 and 25 has occurred, before the degree of deterioration of the catalytic converters 24 and 25 reaches the upper limit (corresponding to the mileage "X"). As a result, the catalytic converters 24 and 25 are replaced with new ones unnecessarily early.

In order to avoid such inconvenience, according to the third embodiment of the invention, the insufficient temperature increase threshold C is variably set in a manner described below based on the mileage of the automobile (corresponding to the degree of deterioration of the first catalytic converter 24 and the second catalytic converter 25). More specifically, the insufficient temperature increase threshold C is variably set based on the degree of deterioration of the catalytic converters 24 and 25 in such a manner that the likelihood that the temperature increase in the catalytic converters 24 and 25 is determined to be insufficient is lower when the mileage of the automobile and the degree of deterioration of the catalytic converters 24 and 25 are lower, as shown In FLU 6.

More specifically, when the mileage of the automobile is "0" (when the catalytic converters 24 and 25 are new), the insufficient temperature increase threshold C that corresponds to the state where the mileage of the automobile is "0" is set. As the mileage of the automobile increases, the insufficient temperature increase threshold C is gradually increased from the value that corresponds to the state where the catalytic converters 24 and 25 are new so that the likelihood that the temperature increase in the catalytic converters 24 and 24 is determined to be insufficient increases. When the degree of deterioration of the catalytic converters 24 and 25 falls within the certain range, the catalytic converters 24 and 25 are able to purify the exhaust gas. The limit value of the insufficient temperature increase threshold C, at which the insufficient temperature increase threshold C stops increasing, is set to a value that corresponds to the upper limit of the certain range (mileage "X"), that is, the value c1. The amount of change in the insufficient temperature increase threshold C per unit change amount of the mileage when the mileage increases from "0" to "X" is set in such a manner that amount of change in the insufficient temperature increase threshold C decreases as the mileage approaches the value "X".

When the degree of deterioration of the catalytic converters 24 and 25 is low, that is, when insufficient temperature increase in the catalytic converters 24 and 25 is unlikely to occur, if the insufficient temperature increase threshold C that is variably set in the above-described manner is used to determine whether insufficient temperature increase in the catalytic converters 24 and 25 has occurred, it is possible to avoid the situation where the likelihood that the temperature increase in the catalytic converters 24 and 25 is determined to be insufficient is significantly increased. Accordingly, it is possible to avoid the situation where the catalyst bed temperature T falls below the insufficient temperature increase threshold C and an erroneous determination that insufficient temperature increase in the catalytic converters 24 and 25 has occurred is made although the degree of deterioration of the catalytic converters 24 and 25 is low and significantly-insufficient temperature increase that may cause a problem has actually not occurred. As the degree of deterioration of the catalytic converters 24 and 25 increases from the value that corresponds to the state where the catalytic converters 24 and 25 are new, that is, as insufficient temperature increase in the catalytic converters 24 and 25 is more likely to occur, the insufficient temperature increase threshold C is increased so that the likelihood that the temperature increase in the catalytic converters 24 and 25 is determined to be insufficient is increased. Accordingly, if significantly-insufficient temperature increase that may cause a problem occurs before the degree of deterioration of the catalytic converters 24 and 25 reaches the upper limit, the catalyst bed temperature T reliably falls below the insufficient temperature increase threshold C and it is determined that insufficient temperature increase in the catalytic converters 24 and 25 has occurred based on this fact. Therefore, the determination is regarded as being appropriate. With this configuration, it is possible to avoid the situation where an erroneous determination that insufficient temperature increase in the catalytic converters 24 and 25 has occurred is made when the degree of deterioration of the catalytic converters 24 and 25 is low, and to accurately determine whether insufficient temperature increase in the catalytic converters 24 and 25 has occurred.

FIG. 7 is a flowchart showing an insufficient temperature increase determination routine used to determine whether insufficient temperature increase has occurred. The insufficient temperature increase determination routine is an interrupt routine that is executed by the electronic control unit 50 at predetermined time intervals.

In the insufficient temperature increase determination routine, if it is determined that recovery of the filter has just been completed ("YES" in S301), that is, if the temperature increasing control has been executed, the insufficient temperature increase threshold C is variably set as indicated by the solid line In FIG. 6 based on the mileage of the automobile (S302). Then, if the estimated catalyst bed temperature T is lower than the insufficient temperature increase threshold C ("YES" in S303), it is determined that insufficient temperature increase in the first catalytic converter 24 and the second catalytic converter 25 has occurred (S304). If it is determined that insufficient temperature increase in the first catalytic converter 24 and the second catalytic converter 25 has occurred, an alarm lamp provided at the driver's seat of the automobile is illuminated after the insufficient temperature increase determination routine ends. If the alarm, lamp illuminates, the catalytic converters 24 and 25 are replaced with new ones.

According to the third embodiment of the invention described above, the following effects are produced. 9) The insufficient temperature increase threshold C used to determine whether insufficient temperature increase in the first catalytic converter 24 and the second catalytic converter 25 has occurred is variably set as indicated by the solid line in FIG. 6 based on the mileage of the automobile that increases as the degree of deterioration of the catalytic converters 24 and 25 increases. If the insufficient temperature increase threshold C is variably set in the above-described manner, it is possible to avoid the situation where an erroneous determination that insufficient temperature increase in the catalytic converters 24 and 25 has occurred is made when the degree of deterioration of the catalytic converters 24 and 25 is low, and to accurately determine whether insufficient temperature increase in the catalytic converters 24 and 25 has occurred.

10) When the degree of deterioration of the catalytic converters 24 and 25 is low, the insufficient temperature increase threshold C is set to a value that is equal to or close to a value that corresponds to the state where the catalytic converters 24 and 25 are new. Therefore, if the insufficient temperature increase threshold C that is variably set in the above-described manner is used to determine whether insufficient temperature increase in the catalytic converters 24 and 25 has occurred, it is possible to avoid the situation where the likelihood that the temperature increase in the catalytic converters 24 and 25 is determined to be insufficient is significantly increased As the degree of deterioration of the catalytic converters 24 and 25 increases, the insufficient temperature increase threshold C is gradually increased so that the likelihood that the temperature increase in the catalytic converters 24 and 25 is determined to be insufficient increases. When the degree of deterioration of the catalytic converters 24 and 25 falls within the certain range, the catalytic converters 24 and 25 are able to purify the exhaust gas. The limit value of the insufficient temperature increase threshold C, at which the insufficient temperature increase threshold C stops increasing, is set to the value c1 that corresponds to the upper limit of the certain range (mileage "X"). Accordingly, for example, when the degree of deterioration of the catalytic converters 24 and 25 is high, if significantly-insufficient temperature increase that may cause a problem occurs, the catalyst bed temperature T reliably falls below the insufficient temperature increase threshold C and it is determined that insufficient temperature increase in the catalytic converters 24 and 25 has occurred based on this fact. Therefore, the determination is regarded as being appropriate.

11) The influence of the increase in the degree of deterioration of the catalytic converters 24 and 25 on occurrence of insufficient temperature increase in the catalytic converters 24 and 25 is the greatest when the catalytic converters 24 and 25 are new, and decreases as the catalytic converters 24 and 25 deteriorate. Based on this characteristic, the insufficient temperature increase threshold C is variably set based on the degree of deterioration of the catalytic converters 24 and 25 (corresponding to the mileage of the automobile). That is, the amount of change in the insufficient temperature increase threshold C per unit change amount of the mileage when the mileage increases from "0" to "X" is set in such a manner that amount of change in the insufficient temperature increase threshold C decreases as the mileage approaches the value "X". Therefore, the insufficient temperature threshold C is changed based on the increase in the degree of deterioration of the catalytic converters 24 and 25 (corresponding to the mileage of the automobile) in the optimum manner that is adopted with the above-described characteristic taken into account.

12) Whether insufficient temperature increase in the catalytic converters 24 and 25 has occurred is determined immediately after completion of recovery of the filter and in the state where the greatest possible amount of PM is removed from the catalytic converters 24 and 25, as in the case of the PM filter 26. Therefore, it is possible to increase the accuracy of the determination as to whether insufficient temperature increase in the catalytic converters 24 and 25 has occurred.

The above-described embodiments of the invention may be modified as follows. In the first to third embodiments of the invention, a filter that supports a NOx catalyst may be used as the PM filter 26.

In the first to third embodiments of the invention, a NOx catalytic converter that supports a NOx catalyst may be provided upstream of the PM filter 26, the unburned fuel components may be supplied to the NOx catalytic converter, and the temperature increasing control may be executed with the use of the heat generated by the oxidation reaction of the unburned fuel components that occurs in the NOx catalyst. In this case, preferably, the oxidation catalytic converter may be provided downstream of the PM filter 26.

In the first to third embodiments of the invention, the mileage is used as the parameter that indicates the degree of deterioration of the exhaust gas control devices. Alternatively, a value indicated by a thermal deterioration counter that is used to detect the degree of thermal deterioration of the exhaust gas control device may be used as the parameter. The value indicated by the thermal deterioration counter is obtained by accumulating additional values, which exhibit larger values at higher catalyst bed temperatures, at predetermined time intervals. The value indicated by the thermal deterioration counter corresponds to the degree of thermal deterioration of the exhaust gas control device.

In the first to third embodiments of the invention, a particle number sensor that detects the particle number of the PM in the exhaust gas may be provided downstream of the PM filter 26, and the particle number may be used as the parameter that indicates the degree of deterioration of the PM filter 26. In this case, the degree of deterioration of the PM filter 26 is determined to be higher as the particle number of PM in the exhaust gas increases.

In the first to third embodiments of the invention, if a NOx catalyst is provided in the exhaust system, a NOx sensor that detects the amount of NOx in the exhaust gas may be provided downstream of the NOx catalyst, and the amount of NOx may be used as the parameter that indicates the degree of deterioration of the NOx catalyst (exhaust gas control device). The degree of deterioration of the NOx catalyst is determined to be higher as the amount of NOx in the exhaust gas increases.

In the first to third embodiments of the invention, the manner in which the perforation threshold A, the clogging threshold B. and the insufficient temperature increase threshold C is changed in accordance with the change in the degree of deterioration of the exhaust gas control devices (mileage of the automobile) may be different from the manner described above. For example, these thresholds may be changed linearly or in a stepwise manner in accordance with the increase in the degree of deterioration of the exhaust gas control devices.

The first to third embodiments of the invention may be combined on an as needed-basis. In the first to third embodiments of the invention, recovery of the filter is described as the recovery of performance of the exhaust gas control device that is achieved by the temperature increasing control. However, when the NOx catalyst is provided in the exhaust system, recovery from sulfur poisoning may be used as the recovery of performance of the exhaust gas control device that is achieved by the temperature increasing control. With the recovery from sulfur poisoning, the NOx purification performance, which has been reduced due to absorption of sulfur components in the NOx catalyst, is recovered.

In the first to third embodiments of the invention, the unburned fuel components, used to execute the temperature increasing control, may be supplied to the exhaust system by supplying the fuel from a fuel supply valve into the exhaust passage 14 instead of supplying the fuel by post injection.

The invention claimed is:

1. A malfunction diagnostic device for an exhaust gas control device, comprising:
    an electronic control unit configured to determine that an exhaust gas control device provided in an exhaust system of an internal combustion engine malfunctions when a parameter that indicates exhaust gas purification performance of the exhaust gas control device crosses a threshold;
    the electronic control unit being configured to determine a degree of deterioration of the exhaust gas control device; and
    the electronic control unit being configured to adjust the threshold based on the degree of deterioration of the exhaust gas control device in such a manner that a likelihood that the exhaust gas control device is determined to be malfunctioning is lower at lower degrees of deterioration of the exhaust gas control device,
    wherein when the exhaust gas control device is new, the electronic control unit is configured to set the threshold to a value that corresponds to a state where the exhaust gas control device is new,
    wherein as the degree of deterioration of the exhaust gas control device increases, the electronic control unit is configured to gradually change the threshold from the value that corresponds to the state where the exhaust gas control device is new in such a manner that the likelihood that the exhaust gas control device is determined to be malfunctioning increases, and
    wherein the electronic control unit is configured to set a limit value of the threshold, at which the threshold stops changing, to a value that corresponds to an upper limit of a certain range of degree of deterioration of the exhaust gas control device, in which the exhaust gas control device is able to purify exhaust gas.

2. The malfunction diagnostic device according to claim 1, wherein the electronic control unit is configured to set an amount of change in the threshold per unit amount of change in the degree of deterioration of the exhaust gas control device in such a manner that the amount of change in the threshold decreases as the degree of deterioration approaches the upper limit of the certain range.

3. The malfunction diagnostic device according to claim 1, wherein the electronic control unit is configured to change the threshold proportionately with an increase in the degree of deterioration of the exhaust gas control device.

4. The malfunction diagnostic device according to claim 1, wherein the electronic control unit is configured to change the threshold in a stepwise manner as the degree of deterioration of the exhaust gas control device increases.

5. The malfunction diagnostic device according to claim 1, wherein:
    the parameter that indicates the exhaust gas purification performance of the exhaust gas control device is a pressure difference between an upstream side of the exhaust gas control device and a downstream side of the exhaust gas control device in the exhaust system of the internal combustion engine; and
    when the pressure difference is less than a perforation threshold, which is variably set as the threshold by the electronic control unit so as to increase as the degree of deterioration of the exhaust gas control device increases, the electronic control unit is configured to determine that perforation of the exhaust gas control device has occurred.

6. The malfunction diagnostic device according to claim 1, wherein:
- the parameter that indicates the exhaust gas purification performance of the exhaust gas control device is a pressure difference between an upstream side of the exhaust gas control device and a downstream side of the exhaust gas control device in the exhaust system of the internal combustion engine; and
- when the pressure difference is equal to or greater than a clogging threshold, which is variably set as the threshold by the electronic control unit so as to decrease as the degree of deterioration of the exhaust gas control device increases, the electronic control unit is configured to determine that clogging of the exhaust gas control device has occurred.

7. The malfunction diagnostic device according to claim 1, wherein:
- the exhaust gas control device includes a catalyst;
- the exhaust gas purification performance of the exhaust gas control device is recovered through a temperature increasing control for increasing a catalyst bed temperature of the catalyst;
- the parameter that indicates the exhaust gas purification performance of the exhaust gas control device is the catalyst bed temperature when the temperature increasing control is executed; and
- when the catalyst bed temperature is lower than an insufficient temperature increase threshold, which is variably set as the threshold by the electronic control unit so as to increase as the degree of deterioration of the exhaust gas control device increases, the electronic control unit is configured to determine that insufficient temperature increase in the exhaust gas control device has occurred.

8. The malfunction diagnostic device according to claim 1, wherein a mileage of an automobile in which the exhaust gas control device is mounted is used as a value that indicates the degree of deterioration of the exhaust gas control device.

9. The malfunction diagnostic device according to claim 1, further comprising:
- a thermal deterioration counter that detects a degree of thermal deterioration of the exhaust gas control device, wherein
- a value indicated by the thermal deterioration counter is used as a value that indicates the degree of deterioration of the exhaust gas control device.

10. The malfunction diagnostic device according to claim 1, wherein the particle number of particulate matter in exhaust gas at a position downstream of the exhaust gas control device is used as a value that indicates the degree of deterioration of the exhaust gas control device.

11. The malfunction diagnostic device according to claim 1, wherein:
- the exhaust gas control device includes a NOx catalyst; and
- an amount of NOx at a position downstream of the NOx catalyst is used as a value that indicates the degree of deterioration of the exhaust gas control device.

12. A malfunction diagnostic method for an exhaust gas control device, comprising:
- detecting a degree of deterioration of an exhaust gas control device provided in an exhaust system of an internal combustion engine;
- adjusting a threshold for a parameter that indicates exhaust gas purification performance of the exhaust gas control device in such a manner that a likelihood that the exhaust gas control device is determined to be malfunctioning is lower at lower degrees of deterioration of the exhaust gas control device; and
- determining that the exhaust gas control device malfunctions when the parameter crosses the threshold,
- wherein when the exhaust gas control device is new, the threshold is set to a value that corresponds to a state where the exhaust gas control device is new,
- wherein as the degree of deterioration of the exhaust gas control device increases, the threshold is gradually changed from the value that corresponds to the state where the exhaust gas control device is new in such a manner that the likelihood that the exhaust gas control device is determined to be malfunctioning increases, and
- wherein a limit value of the threshold, at which the threshold stops changing, is set to a value that corresponds to an upper limit of a certain range of degree of deterioration of the exhaust gas control device, in which the exhaust gas control device is able to purify exhaust gas.

13. The malfunction diagnostic method according to claim 12, wherein an amount of change in the threshold per unit amount of change in the degree of deterioration of the exhaust gas control device is set in such a manner that the amount of change in the threshold decreases as the degree of deterioration approaches the upper limit of the certain range.

* * * * *